US012358672B2

(12) United States Patent
Schmidt-Ellinger et al.

(10) Patent No.: US 12,358,672 B2
(45) Date of Patent: Jul. 15, 2025

(54) STORAGE AND DISPENSING STATION FOR A BLISTER MACHINE

(71) Applicant: Becton Dickinson Rowa Germany GmbH, Kelberg (DE)

(72) Inventors: Hardy Schmidt-Ellinger, Gerolstein (DE); Thomas Jünger, Oberelz (DE)

(73) Assignee: Becton Dickinson Rowa Germany GmbH, Kelberg (DE)

(*) Notice: Subject to any disclaimer, the term of this patent is extended or adjusted under 35 U.S.C. 154(b) by 975 days.

(21) Appl. No.: 17/218,956

(22) Filed: Mar. 31, 2021

(65) Prior Publication Data

US 2022/0315259 A1 Oct. 6, 2022

(51) Int. Cl.
*B65B 35/06* (2006.01)
*B65B 5/10* (2006.01)
(Continued)

(52) U.S. Cl.
CPC .............. *B65B 35/46* (2013.01); *B65B 5/103* (2013.01); *G07F 11/44* (2013.01); *G07F 17/0092* (2013.01)

(58) Field of Classification Search
CPC ... A61J 1/03; B65B 1/10; B65B 5/103; B65B 35/46; G07F 11/44; G07F 17/0092
See application file for complete search history.

(56) References Cited

U.S. PATENT DOCUMENTS 6,073,799 A * 6/2000 Yuyama .............. G07F 17/0092 221/258
7,395,946 B2 * 7/2008 Yuyama .................. B65B 35/08 221/265
(Continued)

FOREIGN PATENT DOCUMENTS

EP 2644512 A2 10/2013
EP 2962956 A1 1/2016
(Continued)

OTHER PUBLICATIONS

Extended European Search Report for Application No. 21166127.7, dated Oct. 12, 2021, 10 pages including machine translation.
(Continued)

*Primary Examiner* — Gene O Crawford
*Assistant Examiner* — Kelvin L Randall, Jr.

(57) ABSTRACT

Storage and dispensing stations for a blister machine for separable small piece goods include a storage container having a housing and a separating device having a coupling device with a lower coupling portion and having a holding device with an actuation member. The storage container is releasably arranged on a dispensing station having a rotary drive having a hub seated on a shaft and having an opening member for interaction with the actuation member. The lower coupling portion, the hub, the actuation member, and the opening member are set relative to one another so that when arranging the storage container on the dispensing station prior to an effective interaction between the actuation members and the opening member, an effective interaction occurs between the lower coupling portion and the hub, and the hub is rotatable in the de-energized state. Methods of operating storage and dispensing stations are also provided.

17 Claims, 6 Drawing Sheets

(51) Int. Cl.

| | |
|---|---|
| ***B65B 35/46*** | (2006.01) |
| ***G07F 11/44*** | (2006.01) |
| ***G07F 17/00*** | (2006.01) |

(56) References Cited

U.S. PATENT DOCUMENTS

| | | | | |
|---|---|---|---|---|
| 9,132,060 | B2 * | 9/2015 | Omura | A61J 3/10 |
| 10,380,824 | B2 * | 8/2019 | Hellenbrand | G07F 11/42 |
| 10,421,566 | B2 * | 9/2019 | Schmidt-Ellinger | A61J 7/0454 |
| 2013/0233894 | A1 * | 9/2013 | Kim | A61J 1/03 222/370 |
| 2014/0203034 | A1 * | 7/2014 | Bae | G07F 17/0092 221/195 |
| 2019/0021955 | A1 * | 1/2019 | Omura | G07F 17/0092 |
| 2021/0022960 | A1 * | 1/2021 | Omura | B65B 35/06 |

FOREIGN PATENT DOCUMENTS

| | | | |
|---|---|---|---|
| EP | 3406237 | A1 | 11/2018 |
| JP | H0710105 | A | 1/1995 |
| WO | WO-2013034504 | A1 | 3/2013 |

OTHER PUBLICATIONS

International Search Report and Written Opinion for Application No. PCT/EP2022/056632, dated Jun. 27, 2022, 18 pages including English translation.

European Office Action for Application No. 21166127.7, dated May 7, 2024, 6 pages including machine translation.

* cited by examiner

STORAGE AND DISPENSING STATION FOR A BLISTER MACHINE

BACKGROUND

The present disclosure relates to a storage and dispensing station for a blister machine for separable small piece goods, in particular drug portions and food supplement portions, as well as to a method for placing a storage container of a storage and dispensing station of the blister machine onto a dispensing station.

SUMMARY

One or more embodiments provide a storage and dispensing station for a blister machine. The storage and dispensing station includes a storage container having a housing enclosing a receiving space having an internally circular-cylindrical portion and a bottom face having a central coupling opening, a separating device arranged in the internally circular-cylindrical portion of the housing, the separating device having a plurality of channels extending vertically through the separating device, a coupling device extending into the central coupling opening and having a lower coupling portion, and a holding device having a holding member and an actuation member, wherein the holding device prevents rotation of the separating device in a blocking position and allows rotation of the separating device in a release position. The storage and dispensing station also includes a dispensing station on which the storage container is releasably arranged. The dispensing station including a rotary drive having a shaft and a hub seated on the shaft for force-transmitting interaction with the lower coupling portion, and an opening member for interaction with the actuation member of the holding device. The lower coupling portion, the hub, the actuation member, and the opening member are set relative to one another in such a way that when arranging the storage container on the dispensing station a first effective interaction occurs between the lower coupling portion and the hub, the first effective interaction occurring prior to a second effective interaction between the actuation member and the opening member, the second effective interaction causing the movement of the holding device into a release position, and the hub is rotatable in the de-energized state.

One or more embodiments provide a storage and dispensing station for a blister machine. The storage and dispensing station includes a storage container having a housing defining a receiving space, a bottom face having a central coupling opening, a separating device arranged in the receiving space, the separating device comprising a plurality of channels, a coupling device extending into the central coupling opening and having a lower coupling portion, and a holding device comprising a holding member and an actuation member, the holding device configured to prevent rotation of the separating device in a first position and to allow rotation of the separating device in a second position. The storage and dispensing station also includes a dispensing station having a rotary drive comprising a shaft and a hub seated on the shaft, the rotary drive configured to provide a force-transmitting interaction with the lower coupling portion, and an opening member configured to interact with the actuation member of the holding device. The lower coupling portion, the hub, the actuation member and the opening member are configured to provide a first interaction between the lower coupling portion and the hub prior to providing a second interaction between the actuation member and the opening member when arranging the storage container on the dispensing station.

One or more embodiments provide a method for placing a storage container of a storage and dispensing station of a blister machine onto a dispensing station, wherein a dispensing station is provided having a hub of a rotary drive and an opening means. The storage container is provided having a housing enclosing a receiving space having an internally circular-cylindrical portion and a bottom face having a central coupling opening, a separating device arranged in the internally circular-cylindrical portion of the housing having a plurality of channels extending vertically through the separating device and having a coupling device extending into the central coupling opening and having a lower coupling portion, and a holding device having a holding means and an actuation means. The holding device preventing rotation of the separating device via the holding means. The storage container being arranged on the dispensing station, characterized in that, when arranging, initially an effective interaction between the coupling portion and the hub is initiated. The hub adapting itself to the coupling portion through a rotation and a form-fit connection and/or frictional connection being produced between the hub and the coupling portion when the interaction begins, and then an effective interaction between the actuation means and the opening means is initiated, the holding means being released when the interaction begins, so that the rotation of the separating device is allowed.

The foregoing and other features, aspects and advantages of the disclosed embodiments will become more apparent from the following detailed description and accompanying drawings.

BRIEF DESCRIPTION OF THE DRAWINGS

In the following, the storage and dispensing station according to the disclosure and the method according to the disclosure are described with reference to the accompanying drawing.

DETAILED DESCRIPTION

Figure 1:
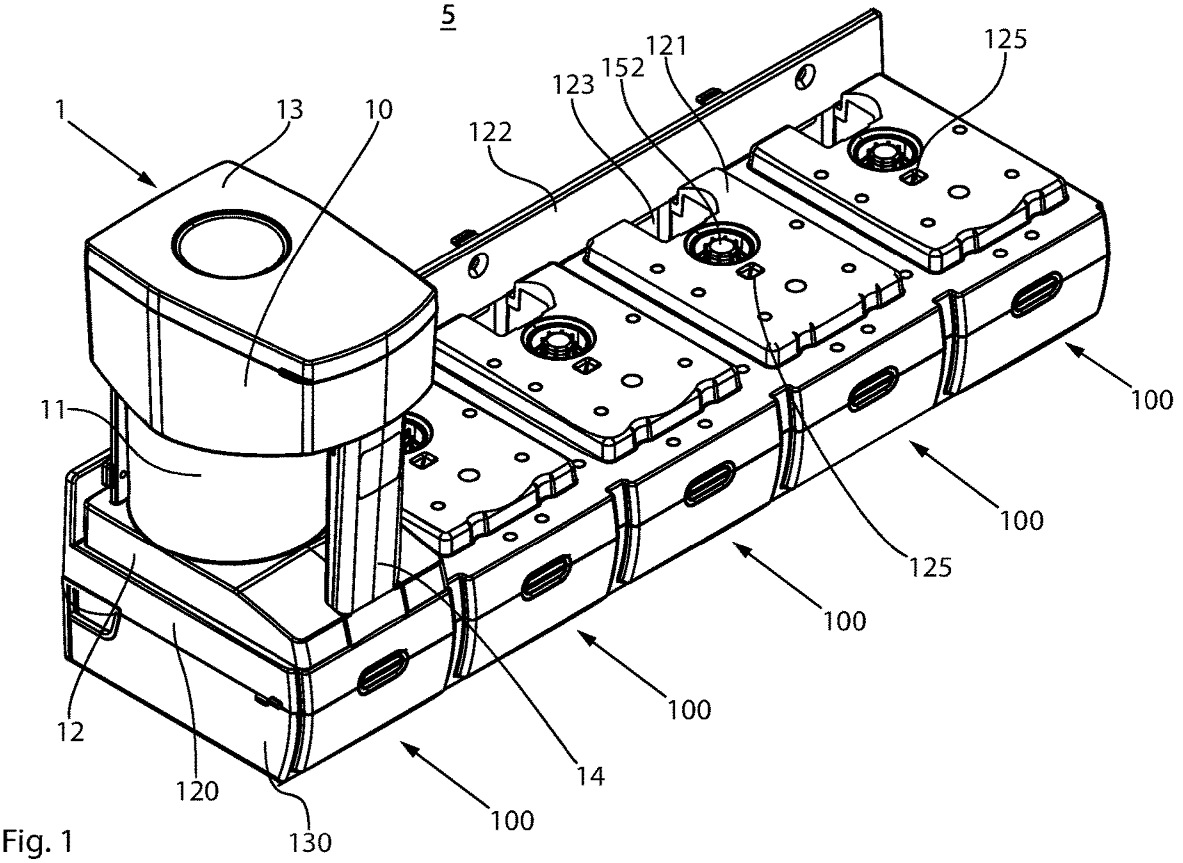
FIG. 1 is a perspective view of one or more embodiments of a storage and dispensing station, according to aspects of the disclosure.

The detailed description set forth below describes various configurations of the subject technology and is not intended to represent the only configurations in which the subject technology may be practiced. The detailed description includes specific details for the purpose of providing a thorough understanding of the subject technology. Accordingly, dimensions are provided in regard to certain aspects as non-limiting examples. However, it will be apparent to those skilled in the art that the subject technology may be practiced without these specific details. In some instances, well-known structures and components are shown in block diagram form in order to avoid obscuring the concepts of the subject technology.

It is to be understood that the present disclosure includes examples of the subject technology and does not limit the scope of the appended claims. Various aspects of the subject technology will now be disclosed according to particular but non-limiting examples. Various embodiments described in the present disclosure may be carried out in different ways and variations, and in accordance with a desired application or implementation.

Modern blister machines, as disclosed, for example, in WO 2013/034504 A1, comprise several hundred storage and dispensing stations, depending on the level of expansion of the blister machine. A plurality of separable small piece goods are stored in each of these, and individual small piece goods can be dispensed on demand. The small piece goods are regularly drug portions and food supplement portions.

With blister machines, for example, drug portions stored in the storage and dispensing stations can be combined and blistered individually for each patient according to the medically prescribed intake times. To put together a plurality of drug portions, appropriate storage and dispensing stations for dispensing one or more drug portions are controlled by means of a control device of the blister machine. In order to dispense a drug portion, a drug portion stored in a storage container is separated with a separating device of the storage and dispensing station and transferred via a dispensing opening to a guide device of the blister machine. With the aid of the guide device, the dispensed drug portion, optionally by interposing a collecting device, is fed to a packaging device, which blisters individual or a plurality of drug portions.

For the separation of the drug portions stored in a storage container of a storage and dispensing station, the separating device comprises a plurality of channels, which are usually arranged on the outer circumference of a base body of the separating device. The channels are adjusted to the respective drug portions to be separated with regard to their dimensions such that the drug portions can only be arranged one above the other, but not adjacent to one another, in a channel. The channels may, for example, be dimensioned in such a way that only one drug portion may be received in one channel.

To dispense a drug portion from a channel, a channel is moved over the dispensing opening in the bottom face of the housing of the storage container, and the drug portion arranged in the channel (at the lowest point) slides or falls due to gravitational force into the dispensing opening. In order to prevent additional drug portions stored in or above the channel from also being dispensed, i.e., an unknown number of drug portions from being dispensed, a retaining portion of a retaining means or separator is guided or arranged at least in or above the channel in the region above the dispensing opening that is aligned with the dispensing opening. The retaining portion is arranged in or above the channel with respect to the height of the channel in such a way that only one drug portion may be arranged under the retaining portion. If the retaining portion is guided into the channel to separate the lowermost drug portion from those arranged above it, individual channel-separating projections have a slot which receives the retaining portion. If the retaining portion is arranged or guided over the channels, it is guided routinely only slightly over the upper ends of the projections to avoid additional drug portions from entering the channel when the drug portion is dispensed.

A storage and dispensing station usually comprises a dispensing station, which is usually releasably connected to the blister machine. The storage and dispensing station further comprises a storage container which is releasably arranged on the dispensing station for easy refilling and/or replacement. When refilling, the small piece goods regularly slip into the aforementioned channels of the separating device. Since the channel of the separating device, which is aligned with the dispensing opening, is blocked by the retaining portion, no small piece good can fall out of the storage container during the actual refilling. A rotation of the separating device is usually prevented by a holding device which is effective in the non-placed state.

With known storage and dispensing stations, however, there is the problem that when placing the storage container, a small piece good is occasionally dispensed unintentionally. When placing, the separating device aligns itself via a coupling device on the hub of a drive arranged in the dispensing station. Due to the rotation brought about, it is possible, depending on the nature and arrangement of the channels, that a filled channel (which was not blocked by the retaining portion) is rotated over the dispensing opening and then a small piece good is dispensed. It is true that this problem does not occur for every placing operation, but since the small piece good gets into the blister machine when it is dispensed, only occasional unwanted dispensing operations are also very disruptive.

It is therefore the object of the present disclosure to provide a storage and dispensing station in which unwanted dispensing of small piece goods is excluded when placing a storage container onto a dispensing station. It is also an object of the disclosure to provide a method for placing a storage container onto a dispensing station, in which this is excluded.

A storage and dispensing station according to the disclosure comprises a storage container having a housing enclosing a receiving space having an internally circular-cylindrical portion and a bottom face having a central coupling opening and having a separating device arranged in the internally circular-cylindrical portion of the housing having a plurality of channels extending vertically through the separating device and having a coupling device extending into the central coupling opening and having a lower coupling portion. The storage container further comprises a holding device having a holding means and an actuation means, wherein the holding device prevents rotation of the separating device in a blocking position and allows rotation of the separating device in a release position and is movable between these positions.

The storage and dispensing station according to the disclosure further comprises a dispensing station on which the storage container is releasably arranged. having a rotary drive having a shaft and a hub seated on the shaft for force-transmitting interaction with the lower coupling portion. The dispensing station further comprises an opening means for interaction with the actuation means of the holding device.

According to the disclosure, it is provided that the lower coupling portion, the hub, the actuation means, and the opening means are set relative to one another in such a way that when arranging the storage container on the dispensing station prior to an effective interaction between the actuation means and the opening means, which causes the movement of the holding device into the release position, an effective interaction occurs between the lower coupling portion and the hub. Since a rotation of the coupling device (and thus the separating device) is only possible in the release position, it is necessary according to the disclosure that the hub is rotatable in the de-energized state so that when the interaction between the hub and the lower coupling portion begins, the hub (and not the separating device) can rotate into the coupling position. According to the disclosure, precisely that which led to the unintentional dispensing is prevented, namely the possibility of aligning (via a rotation) the coupling device (and thus the separating device) on the hub. When aligning the coupling device with or on the hub, only the hub must (and can) rotate. In the case of storage and dispensing stations from the prior art, this was different—the alignment causes the unwanted rotation of the separating device and thus possibly the dispensing of a small piece good.

A number of possibilities are known to the person skilled in the art as to how the aforementioned components can be placed relative to one another according to the disclosure. Thus, it is only possible to solve the interaction between the opening means and the actuation means with the help of a light barrier or a contactor when position X is reached: Trigger interaction (trigger release position of the holding device).

In a structurally particularly simple solution that only uses purely mechanical components, it is provided that the opening means is designed as a recess in the dispensing station and the actuation means is designed as a corresponding vertical nose, that the interaction between the hub and the lower coupling portion defines an effective coupling engagement depth and the interaction between the actuation means and the opening means defines an effective holding engagement depth (HET) and that the coupling engagement depth (CET) is greater than the holding engagement depth (HET). By designing the engagement depths according to the disclosure, it is ensured that the coupling interaction is always first engaged before the holding interaction (and thus the approach to the release position of the holding device) is initiated.

In one or more embodiments, the hub and the opening means have an effective height that is identical in relation to the vertical axis of the dispensing station, and the lower coupling portion, in relation to the vertical axis of the storage container, has an effective depth below an effective depth of the actuation means. The term "effective height" means the "height" or position within the dispensing station from which an interaction with the corresponding component (e.g. hub <->lower coupling portion) takes place. Correspondingly, the "effective depth" describes the "depth" or position within the storage container from which an interaction with the corresponding component can take place.

In one or more embodiments, which is also kept structurally very simple, the lower coupling portion and the actuation means have an identical effective depth in relation to the vertical axis of the storage container. The hub, in relation to the vertical axis of the dispensing station, has an effective height above the effective height of the opening means.

According to the disclosure, a dispensing station is provided with a hub of a rotary drive and with an opening means. Furthermore, a storage container is provided having a housing enclosing a receiving space having an internally circular-cylindrical portion and a bottom face having a central coupling opening, a separating device arranged in the internally circular-cylindrical portion of the housing having a plurality of channels extending vertically through the separating device and having a coupling device extending into the central coupling opening and having a lower coupling portion and a holding device having a holding means and an actuation means, the holding device preventing a rotation of the separating device via the holding means. The storage container is then arranged on the dispensing station, initially an effective interaction being initiated according to the disclosure between the lower coupling portion and the hub, the hub adapting (or being able to adapt) itself to the coupling portion through a rotation and a form-fit connection and/or frictional connection being produced between the hub and coupling portion when the interaction begins, and an effective interaction between the actuation means and the opening means is then initiated, the holding means being released when the interaction begins, so that the rotation of the separating device is allowed.

In one or more embodiments, which can be carried out with a structurally particularly simply designed storage container or designed dispensing station, the opening means being designed as a recess in the dispensing station and the actuation means being designed as a corresponding vertical nose, the interaction between the hub and the lower coupling portion is initiated by generating an effective coupling engagement depth (KET) by means of a frictional connection and/or form-fit connection of the hub and the lower coupling portion, and the interaction between the actuation means and the opening means is initiated by guiding the actuation means into the opening means and thereby releasing the holding means, and thus an effective holding engagement depth (HET) is generated, the coupling engagement depth (KET) being greater than the holding engagement depth (HET).

FIG. 1 shows a perspective view of one or more embodiments of a storage and dispensing station 5 according to aspects of the disclosure, the storage and dispensing station 5 having a storage container 1 and a dispensing station 100. As shown, the dispensing station 100 is part of a composite of five dispensing stations 100, wherein, in order to simplify the attachment of the dispensing stations 100 to a blister machine (not shown), such a composite as a whole is regularly fastened to the blister machine. In one or more embodiments, the dispensing stations 100 can be separated from one another or combined in composites with a different number of dispensing stations 100. The components mentioned in the following description of the dispensing station

100 are present in each dispensing station 100, regardless of whether they are configured as a composite, as shown in FIG. 1, or separately.

Each dispensing station 100 comprises a lower portion 130 and an upper portion 120. The upper portion 120 comprises a projection 121 on which a storage container can be placed. For this purpose, a lower housing portion of the storage container 1 is adjusted to the geometry of the projection 121. The projection 121 comprises an opening 123 which, when the storage container 1 is placed, is aligned with a dispensing opening 22 in a bottom face 20 of a housing 10 of a storage container 1, as is described with reference to the following figures. In the event of separation, a small piece good falls from a channel 32 via the aforementioned dispensing opening 22 into the opening 123 of the projection 121. The upper portion 120 of the dispensing station 100 further comprises a vertical portion 122, via which the dispensing station 100 can be fastened to the blister machine.

Each dispensing station 100 further comprises an opening member 125 which, as shown in FIG. 1, is designed as a depression in the projection 121. The precise design of the opening member 125 is described in more detail with reference to the following figures. The projection 121 comprises a further opening through which a hub 152 of a drive extends and which interacts with the storage container 1, as is described with reference to the following figures.

As shown, the storage container 1 placed on the dispensing station 100 comprises a housing 10 which comprises an internally circular-cylindrical portion 11. An upper part of the housing 10 is provided with a cover 13 which can be removed for the purpose of refilling small piece goods. In a lower part of the housing 10, the storage container 1 comprises a base plate 12 which is adjusted to the geometry of the dispensing station 100 and the projection 121. Furthermore, for easy handling, the storage container 1 comprises a handle 14 with which the storage container 1 can be removed from the dispensing station 100 and placed thereon again.

Figure 2A:
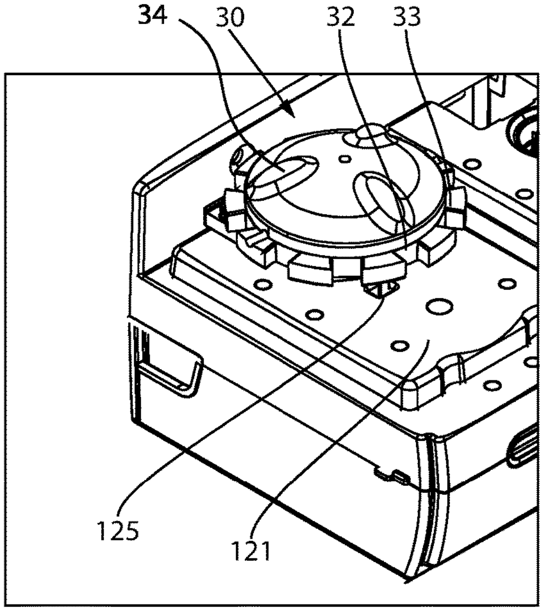
FIGS. 2*a* and 2*b* are detailed views of the storage and dispensing station of FIG. 1 with parts of the storage container being omitted, according to aspects of the disclosure.

In the detailed view shown in FIG. 2*a*, among other things, the housing 10 including the internally circular-cylindrical portion 11 is omitted, and it can be seen that a separating device 30 is arranged in the internally circular-cylindrical portion 11, the outer circumference of the separating device 30 having a multitude of channels 32, these channels 32 being each separated by webs 33. The separating device 30 has a conical surface, which as shown, has three projections 34. Both the conical design of the surface and the aforementioned projections 34 serve to guide overlying small piece goods to the channels 32 during the rotation of the separating device 30.

Figure 2B:
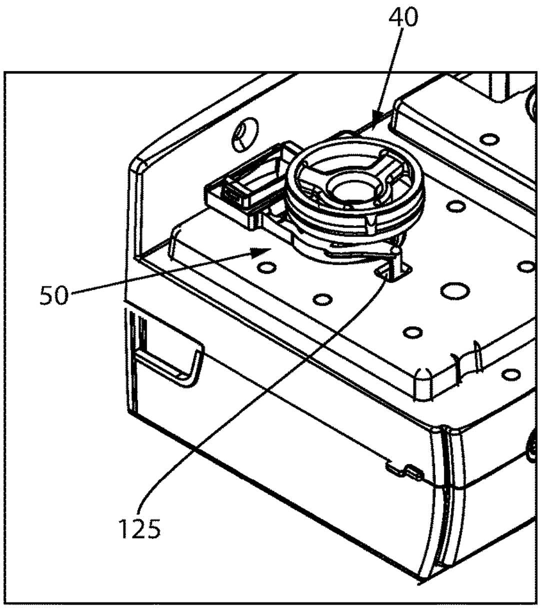

In the detailed view shown in FIG. 2*b*, the separating device 30 is also omitted, and a coupling device 40 that is otherwise non-rotatably connected to the separating device 30 and a holding device 50 can be seen, both of which are described in more detail with reference to the following figures. It can already be seen in FIG. 2*b* that a vertical portion of the holding device 50 extends into the opening member 125.

Figure 3B:
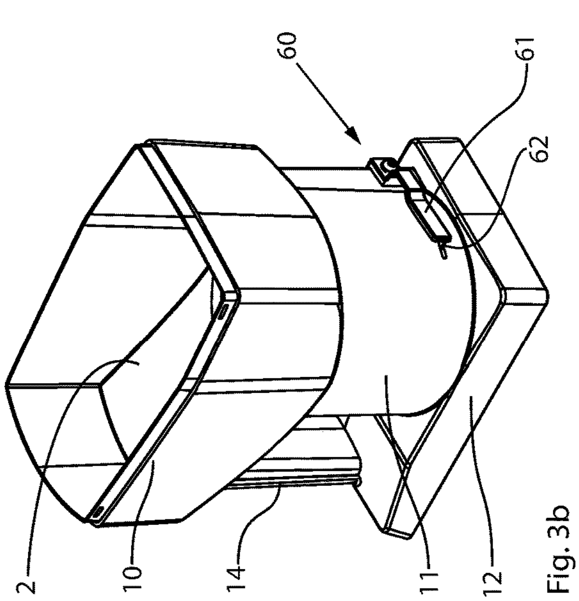
FIGS. 3*a*-3*d* are perspective and top views of a storage container, according to aspects of the disclosure.

FIGS. 3*a*-3*d* show different views of the storage container 1, the placed state of the storage container 1 being shown and the dispensing station 100 being omitted for the sake of clarity. As can be seen in FIG. 3*b*, the housing 10 (and also a portion of the internally circular-cylindrical portion 11) encloses a receiving space 2 for small piece goods to be separated. In FIG. 3*b*, a retaining assembly 60 can also be seen which is fastened to a vertical wall portion of the housing 10 via a fastening portion 61. The retaining assembly 60 further comprises a retaining portion 62, only indicated in FIG. 3*b*, which is inserted through a slot in the internally circular-cylindrical portion 11 and is intended to prevent small piece goods from slipping into a channel 32 that is aligned with and above a dispensing opening 22 in a bottom face 20 of the housing (see FIG. 3*c*).

Figure 3D:
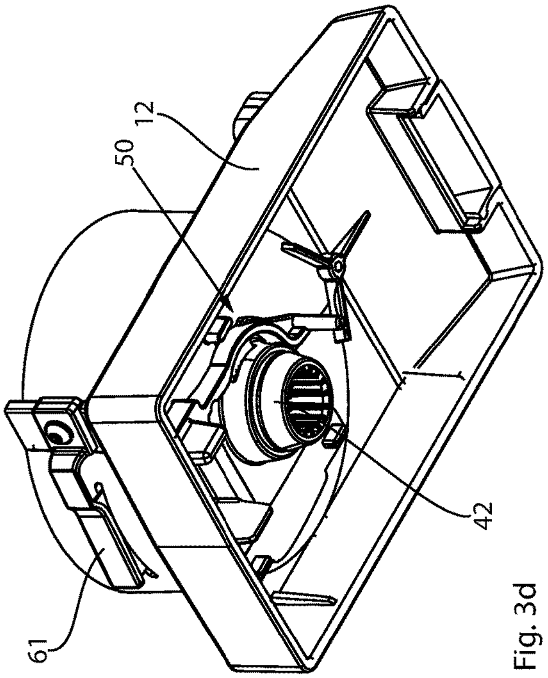
Figure 3A:
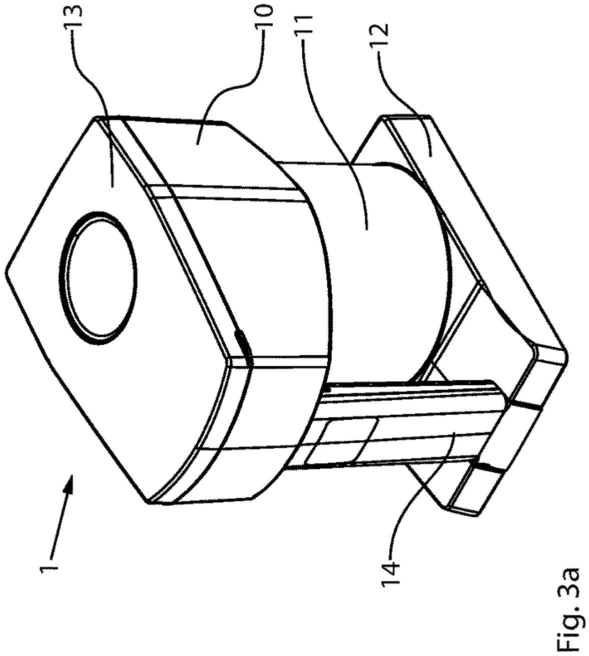
Figure 3C:
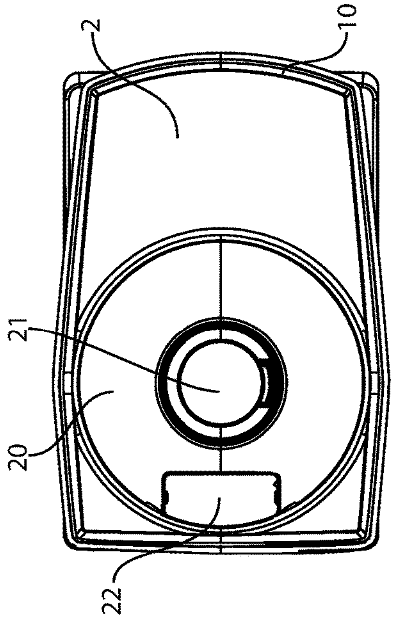

As can be seen in FIG. 3*c*, the bottom face 20 comprises a coupling opening 21 through which, as can be seen in FIG. 3*d*, a lower coupling portion 42 of the coupling device 40 extends. It can also be seen in FIG. 3*d* that the holding device 50 is arranged with a portion, which is described in more detail below, near the circumference of the lower coupling portion 42. In FIG. 3*d*, the holding device 50 is shown in relation to the coupling device 40 (and thus the separating device 30) in the released state, i.e. the holding device 50 does not block the rotation of the coupling device 40 and thus does not block the rotation of the separating device 30.

Figure 5:
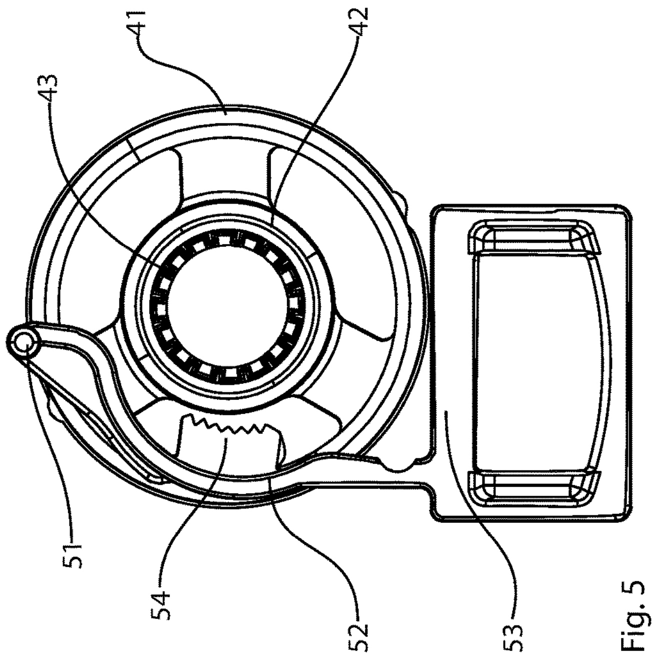
FIG. 5 is a top plan view of the combination coupling device/holding device of FIGS. 4*a*, 4*b*, according to aspects of the disclosure.
Figure 6:
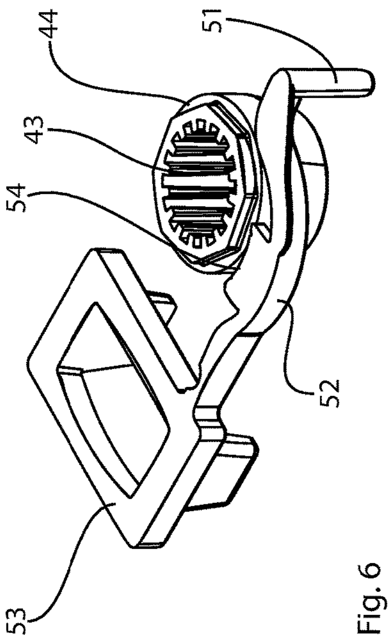
FIG. 6 is a cross-section perspective view of the combination coupling device/holding device of FIGS. 4*a*, 4*b*, according to aspects of the disclosure.
Figure 4A:
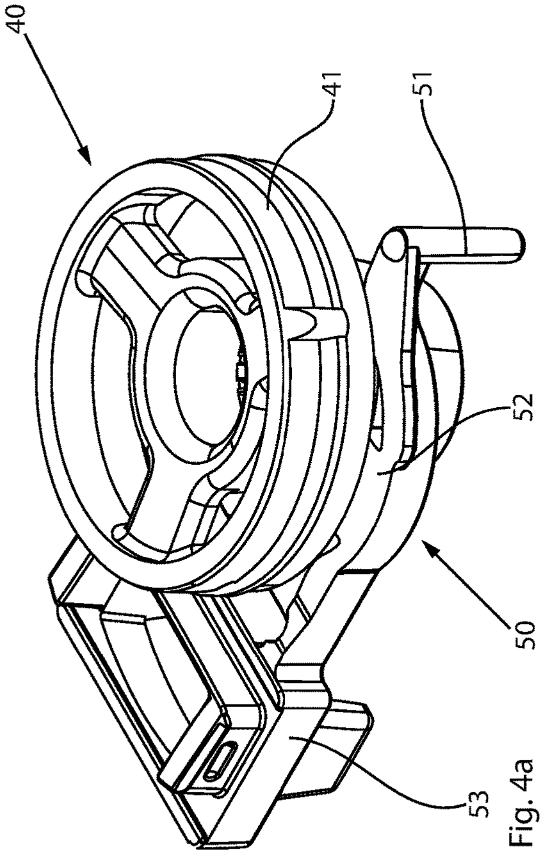
FIGS. 4*a* and 4*b* are perspective views of a combination coupling device/holding device, according to aspects of the disclosure.
Figure 4B:
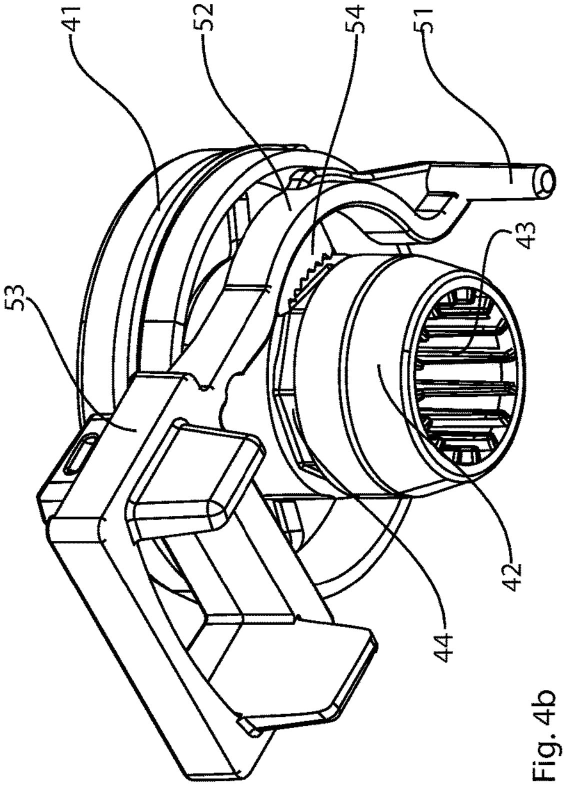

FIGS. 4*a* and 4*b* show perspective views of a combination coupling device 40/holding device 50, the placed state being shown again. As can be seen in particular in FIG. 4*b*, the coupling device 40 comprises an upper portion 41, via which the coupling device 40 can (releasably) be connected to the separating device 30 (and is connected during operation). The lower portion of the coupling device 40 is formed by a lower coupling portion 42, having an opening which, as shown, extends through the entire coupling device 40, as can be seen in FIG. 5. The lower coupling portion 42 comprises webs 43 by which there is a frictional connection and/or form-fit connection with a hub 152 of a drive 150, described in more detail with reference to the following figures, can be produced in a dispensing station 100.

As shown, the coupling device 40 further comprises a circumferential groove 44, wherein for the circumferential groove 44 shown the bottom face thereof is not of a circular design, but is rather designed in the form of a polygon. A holding member 54 of the holding device 50 can engage in this groove 44. As shown, the holding member 54, as indicated in FIGS. 4*b* and 5, comprises a toothed, slightly curved surface, as a result of which a form-fit connection and frictional connection can be produced with the bottom face of the groove 44. In the state shown in FIGS. 4*a*, 4*b*, 5 and 6, such an engagement does not take place (e.g., the holding device 50 does not block the rotation of the coupling device 40 and thus of the separating device 30).

The holding device 50 comprises, in addition to the holding member 54, a web 52 designed curved in portions which ends at one end in a vertical actuation member 51 which, as described in more detail with reference to the following figures, can interact with an opening member 125 of the dispensing station 100 to release or lock the holding device 50. Opposite the actuation member 51, the holding device 50 has a fastening member 53. As shown, as is indicated in FIG. 3*d*, this fastening member 53 can be fastened from below in the opening 123 of the projection 121 of the dispensing station 100.

In a view of FIGS. 4*a*, 4*b*, 5, and 6, it is already clear how the holding device 50 can block a rotation of the coupling device 40 and thus of the separating device 30. As shown, the web 52 is designed to be elastic and is pretensioned towards the blocking position. When the holding device 50 is no longer pushed into the release position via the actuation member 51, the elastic web 52 presses the holding member 54 into the groove 44 of the coupling device 40, so that a frictional connection and/or form-fit connection takes place between the holding member 54 and the bottom face of the groove 44 so that rotation of the coupling device 40 is prevented. Such a blocking position is always present when the actuation member 51 is "free," i.e. whenever the storage container 1 is completely removed from the dispensing station 100.

Figure 7:
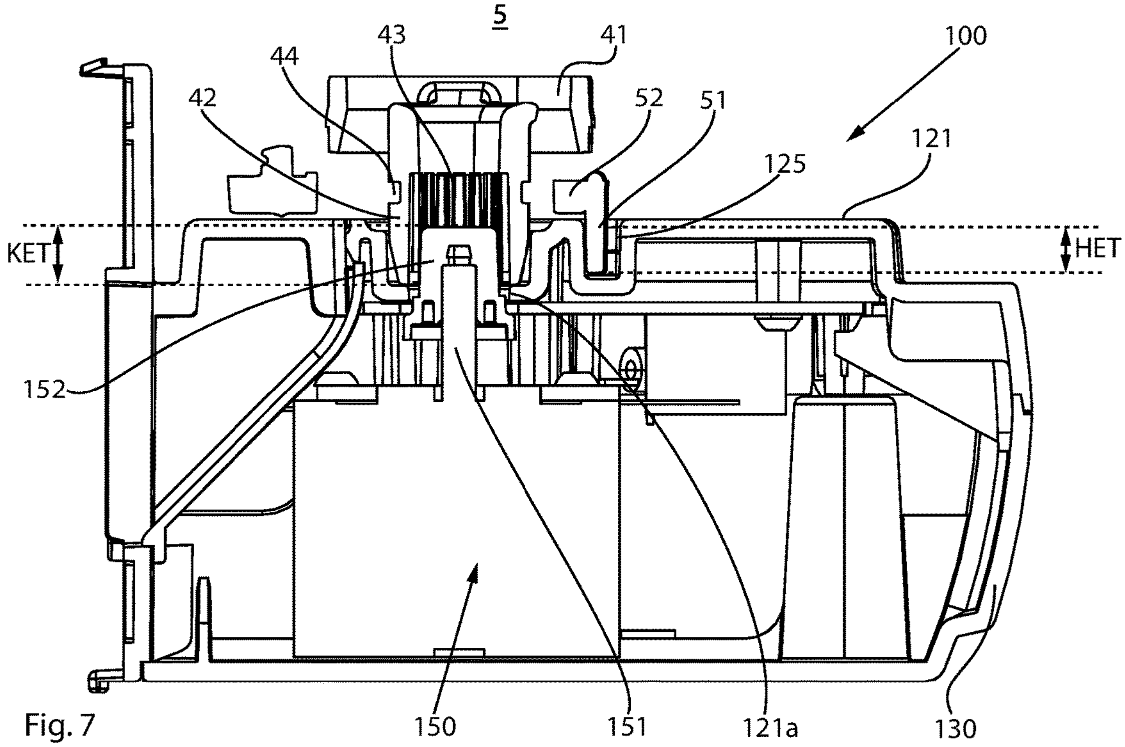
FIG. 7 is a cross-sectional view of the storage and dispensing station of FIG. 1, parts of the storage container being omitted.

FIG. 7 shows a sectional view through the storage and dispensing station 5, with a multitude of the parts of the storage container 1, for example the housing 10 and bottom face 20, being omitted. According to aspects of the disclosure, in the case of the storage and dispensing station 5 the problem of the unintentional dispensing of a small piece good, caused by the rotation of the separating device 30 when placing the storage container 1, is solved in that the lower coupling portion 42 of the coupling device 40, the hub 152, the actuation member 51 of the holding device 50, and the opening member 125 are specially set relative to one another in such a way that when placing the storage container 1, an effective interaction occurs between the lower coupling portion 42 and the hub 152, whereby the shaft 151 of the drive 150 is aligned when the coupling portion 42 is aligned with the coupling device 40 due to the hub 152, which is rotatable in the de-energized state.

According to aspects of the disclosure, a rotation of the separating device 30 cannot take place, since when the aforementioned interaction takes place there is no interaction between the actuation member 51 and the opening member 125 yet, this interaction being necessary for releasing or moving the holding member 54 away. According to aspects of the disclosure, the rotation of the separating device 30 (via the coupling device 40) is only released when the coupling device 40 already interacts with the hub 152 and the hub 152 (and not the separating device 30) has been rotated in the course of this interaction. In order to achieve this, a multitude of special embodiments of the aforementioned components are possible. For example, it is contemplated that the interaction between the actuation member 51 and the opening member 125 is triggered by a light barrier or an electrical contact. However, these designs are structurally relatively complex and prone to errors.

In one or more embodiments of the storage and dispensing station 5 according to the disclosure, a different approach is therefore used, namely a purely mechanical one. The actuation member 51 of the holding device 50 is designed as a type of nose, and the counterpart, the opening member 125, as a depression in the projection 121, this depression having a special geometry.

The storage and dispensing stations 5 according to the disclosure described in more detail in the following figures have in common that the interaction between the hub 152 and the lower coupling portion 42 of the coupling device 40 defines an effective coupling engagement depth KET and the interaction between the actuation member 51 of the holding device 50 and the opening member 125 defines an effective holding engagement depth HET, the coupling engagement depth KET being greater than the holding engagement depth HET. This always has the consequence that the aforementioned principle is fulfilled when placing the storage container 1 onto the dispensing station 100, namely that the effective interaction between the lower coupling portion 42 and the hub 152 only takes place before the interaction between the actuation member 51 and the opening member 125 causes a releasing of the brake, i.e. a moving of the holding member 51 away from the coupling device 40.

FIG. 7 shows a section in which the storage container 1 is arranged ready for operation on the dispensing station 100. The effective coupling engagement depth KET is defined by the lower edge (e.g., the effective depth) of the lower coupling portion 42 and the upper edge (e.g., effective height) of the hub 152. This effective coupling engagement depth KET is shown in FIG. 7 by dashed lines on the left. As provided according to aspects of the disclosure, the effective holding engagement depth HET, which is represented by dashed lines on the right, is smaller than the effective coupling engagement depth KET. This effective holding engagement depth HET is defined by the lower edge (e.g., effective depth) of the actuation member 51 and the upper effective edge (e.g., effective height) of the opening member 125.

As already explained, the release of the holding device 40 as described here is effected purely mechanically. For this purpose, it is necessary that the actuation member 51 is moved through the opening member 125 in such a way that the holding member 54 no longer prevents rotation of the coupling device 30, i.e. the holding member 54 must be moved away from the axis of rotation of the coupling device 30. With regard to the holding device 50 shown in more detail in the aforementioned figures, it can be said that it has to be "bent open." In order to achieve this, the opening member 125 has, as can be seen in FIG. 8*b*, an inclined portion 126 (e.g., active portion), at the upper end of which the effective height of the opening member 125 begins. If the actuation member 51 is moved into the opening member 125 when placing the storage container 1, this inclined portion 126 causes the actuation member 51 (with reference to FIG. 7) to be moved out of the plane of the drawing, whereby the holding member 54 is released from the coupling device 40, whereby the rotation is released.

In FIG. 7, it can also be seen that the hub 152 is seated on a shaft 151 of a rotary drive 150. The hub 152 is non-rotatably connected to the shaft 151 and extends through an opening 121*a* in the projection 121 of the storage container 1.

Figure 8A:
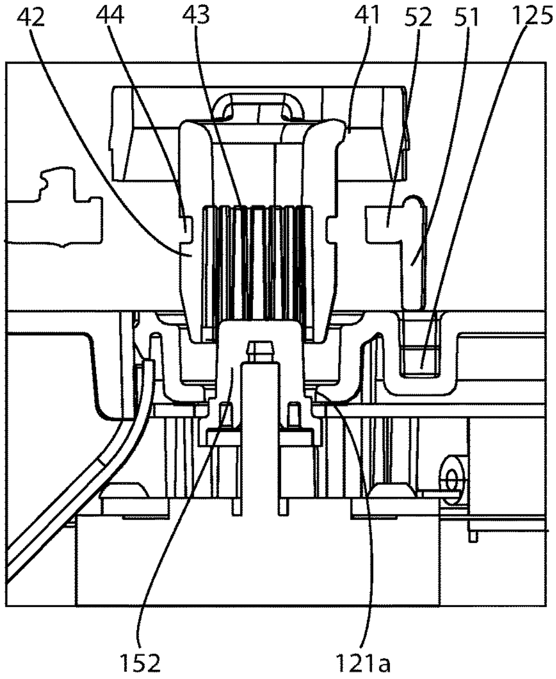
FIGS. 8*a* and 8*b* are detailed cross-sectional views of the storage and dispensing station of FIG. 7, the combination of coupling device/holding device being displaced vertically upwards.
Figure 8B:
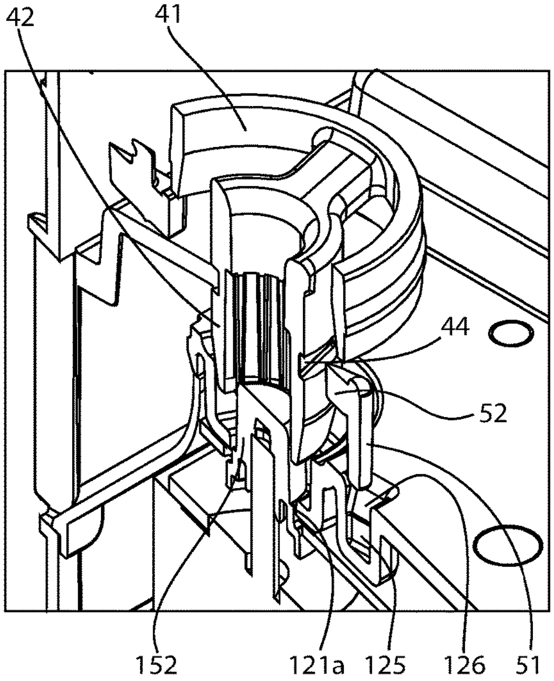

FIG. 8*a* shows a detailed view of the section from FIG. 7, the coupling device 40 and the holding device 50 being moved upward so far that the actuation member 51 has not yet engaged in the opening member 125, i.e. no effective interaction has yet taken place between them. However, as can be seen when looking at the lower coupling portion 42 and the hub 152, an effective interaction between the webs 43 and the hub 152, i.e. a frictional connection and/or form-fit connection between these two elements, has already taken place at the "point in time" shown in FIG. 8*a*. However, since the coupling device 40 is still prevented from rotating by the holding device 50, more precisely the holding member 54, the hub 152 was possibly rotated "into position" when this interaction was initiated so that this interaction could take place. When the rotation of the hub 152 has taken place and the combination of coupling device 40/holding device 50 is moved further downwards, i.e. the storage container 1 is placed further on, there is also an interaction between the actuation member 51 and the opening member 125, i.e. the holding member 54 is moved away by the coupling device 40 and the rotation is released.

In FIG. 8*b*, it can be seen that the opening member 125 has an inclined portion (e.g., active portion) 126, which causes the movement of the actuation member 51 and thus, via the web 52, of the holding member 54. When the storage container 1 is in its final position, which is shown in FIG. 7, both interactions have taken place or are taking place, the different depths of engagement determining the sequence of interactions.

Figure 9A:
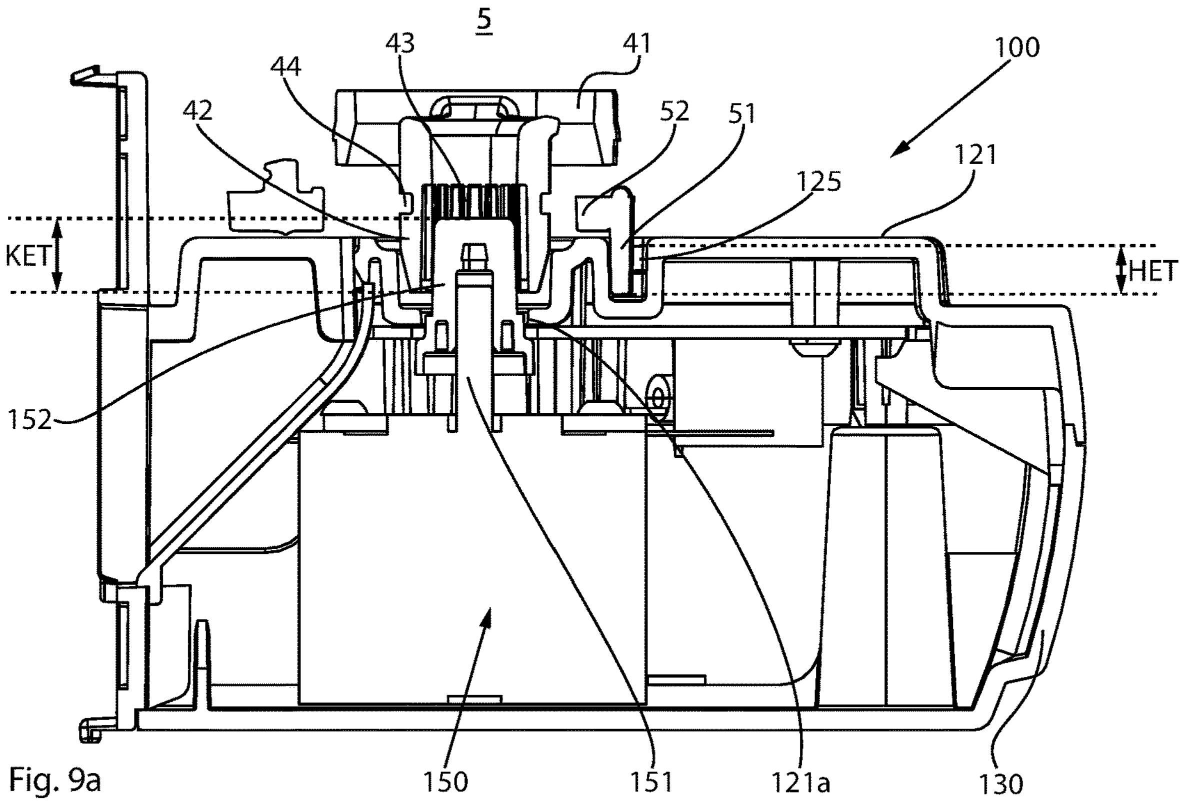
FIGS. 9*a* and 9*b* are cross-sectional views of one or more embodiments of a storage and dispensing station, according to aspects of the disclosure, in which parts of the storage container have been omitted and in which in FIG. 9*b* the combination of coupling device/holding device is displaced vertically upwards.
Figure 9B:
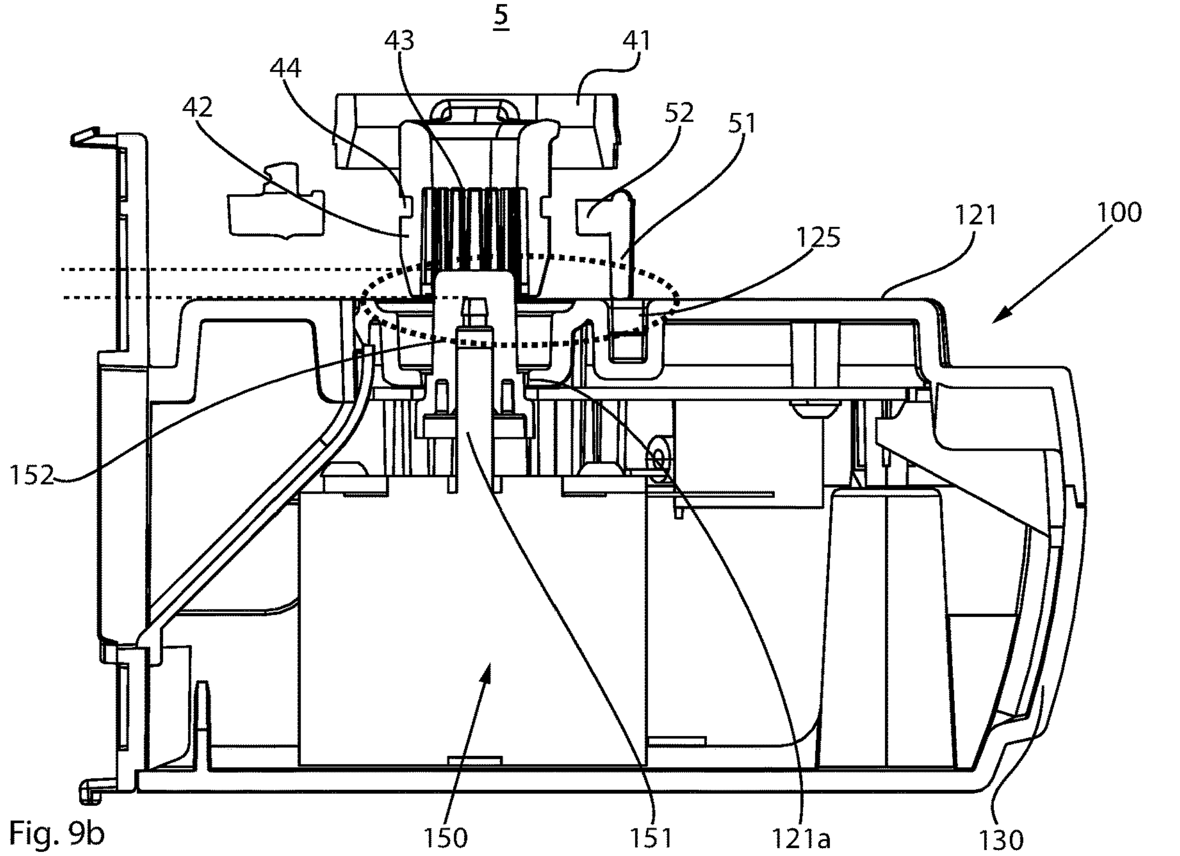

FIGS. 9*a* and 9*b* are sectional views through one or more embodiments of the storage and dispensing station 5 according to aspects of the disclosure, in which again parts of the storage container 1 have been omitted and in which in FIG. 9*b* the combination of coupling device 40/holding device 50 is displaced vertically upwards. Here, the principle according to the disclosure is achieved in that the effective height of the hub 152 is increased (compared to that discussed above) and lies above the surface of the projection 121. In this way, first the interaction between the hub 152 and the lower coupling portion 42 and then the interaction between the actuation member 51 and the opening member 125 take place; the coupling and holding engagement depths KET, HET and their ratio to one another corresponding to that discussed above.

Figure 10:
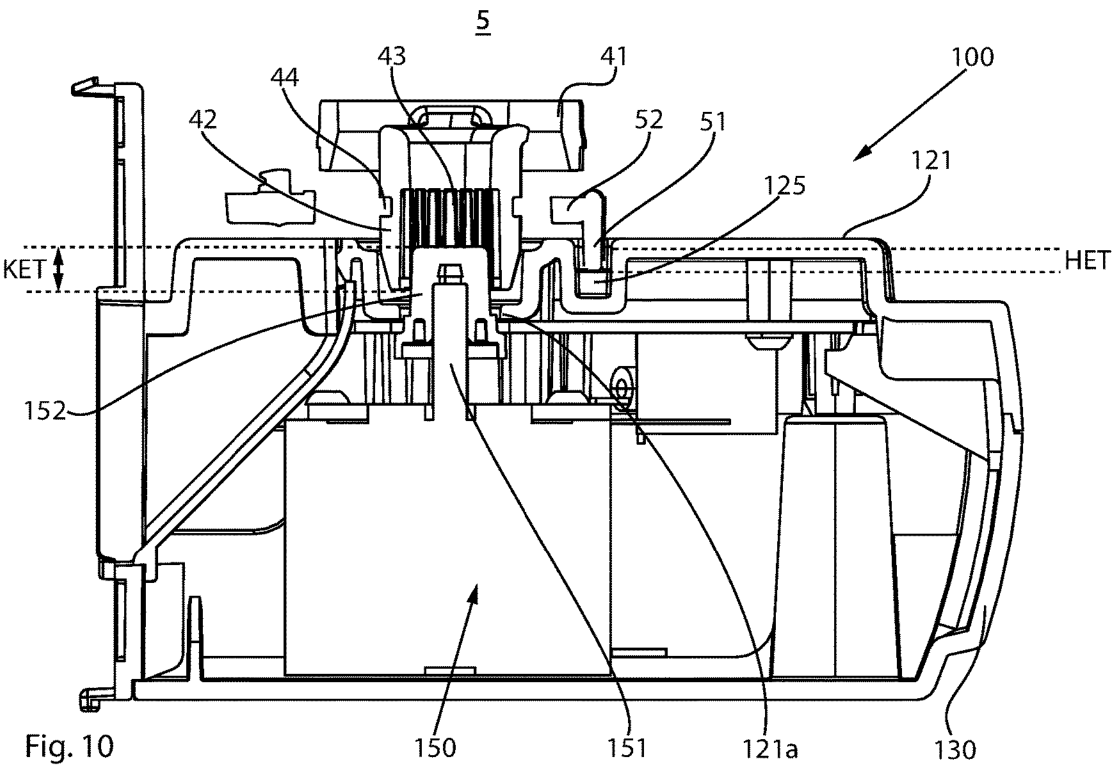
FIG. 10 is a cross-sectional view of one or more embodiments of a storage and dispensing station, according to aspects of the disclosure.
Figure 11A:
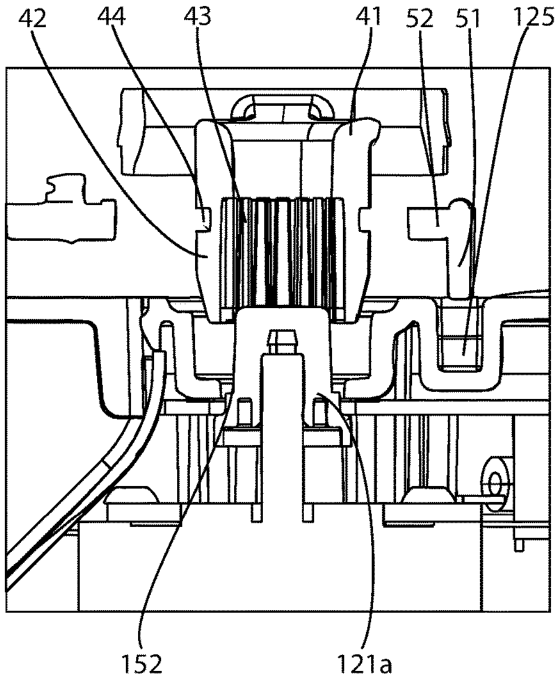
FIGS. 11*a* and 11*b* are cross-sectional views of the storage and dispensing station of FIG. 10, the combination of coupling device/holding device being shown displaced vertically.
Figure 11B:
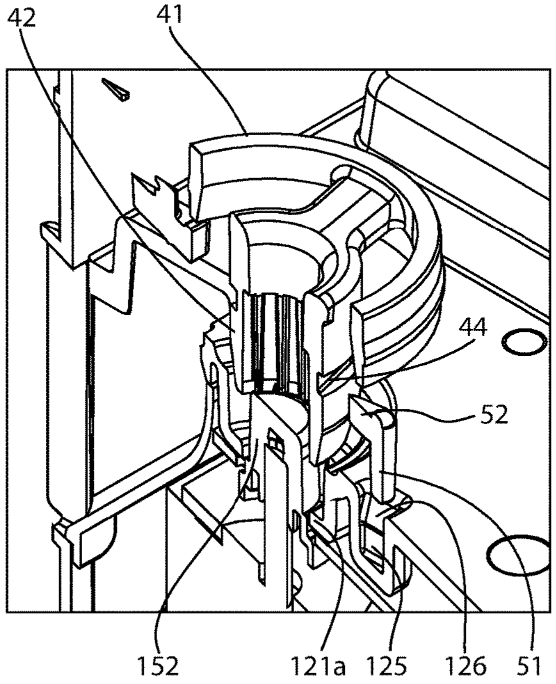

FIG. 10 shows a sectional view through one or more embodiments of the storage and dispensing station 5 according to aspects of the disclosure, and FIGS. 11*a* and 11*b* show detailed views of the section from FIG. 10, the combination coupling device 40/holding device 50 also being shown displaced vertically in these figures. Here, the principle according to the disclosure is achieved in that the effective depth of the actuation member 51 is reduced compared to those discussed above.

One or more embodiments of a method according to aspects of the disclosure is described below. In one or more embodiments of the method for placing a storage container 1 of a storage and dispensing station 5 onto a dispensing station 100, the dispensing station 100 and the storage container 1 are first provided. In this state of readiness, the holding device 50 of the storage container 1 is in the locked position, and a dispensing of a small piece good by a rotation of the separating device 30 cannot take place. The storage container 1 is then arranged on the dispensing station 100, which is illustrated in FIGS. 11*a*, 11*b*, and 10. When arranging, an effective interaction between the coupling portion 42 and the hub 152 is initiated, the hub 152 adapting (or being able to adapt) itself to the coupling portion 42 through a rotation and a form-fit connection and/or frictional connection being produced between the hub 152 and the coupling portion 42 when the interaction begins.

An effective interaction between the actuation member 51 and the opening member 125 is then initiated, the holding member 54 being released when the interaction begins, so that the rotation of the separating device 30 is allowed. As shown in FIGS. 10-11*b*, the opening member 125 is designed as a recess or depression in the dispensing station 100 and the actuation member 51 is designed as a corresponding vertical nose. The aforementioned interaction between the hub 152 and the lower coupling portion 42 is initiated by generating an effective coupling engagement depth KET by means of a frictional and/or form-fit connection of the hub 152 and the lower coupling portion 42. The interaction between the actuation member 51 and the opening member 125 is initiated by guiding the actuation member 51 into the opening member 125 and thereby releasing the holding member 54, an effective holding engagement depth (HET) being generated. As stated above, the coupling engagement depth KET is greater than the holding engagement depth HET.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

The word "exemplary" or the term "for example" is used herein to mean "serving as an example or illustration." Any aspect or design described herein as "exemplary" or "for example" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way.

What is claimed:

1. A storage and dispensing station for a blister machine, comprising:

a storage container comprising:

a housing enclosing a receiving space having an internally circular-cylindrical portion;

a bottom face having a central coupling opening;

a separating device arranged in the internally circular-cylindrical portion of the housing, the separating device having a plurality of channels extending vertically through the separating device;

a coupling device extending into the central coupling opening and having a lower coupling portion;

a holding device having a holding member and an actuation member, wherein the holding device prevents rotation of the separating device in a blocking position and allows rotation of the separating device in a release position; and a dispensing station on which the storage container is releasably arranged, the dispensing station comprising:

a rotary drive having a shaft and a hub seated on the shaft for force-transmitting interaction with the lower coupling portion, the hub disposed in a first opening in a top surface of the dispensing station; and an opening member for interaction with the actuation member of the holding device, the opening member comprising a separate second opening comprising a recess in the top surface of the dispensing station that is disposed outside of and adjacent to an outer perimeter of the first opening in the top surface of the dispensing station, wherein the lower coupling portion, the hub, the actuation member and the opening member are set relative to one another in such a way that when arranging the storage container on the dispensing station a first effective interaction occurs between the lower coupling portion and the hub, the first effective interaction occurring prior to a second effective interaction between the actuation member and the opening member, the second effective interaction causing movement of the holding device into a release position, and wherein the hub is rotatable in a de-energized state.

2. The storage and dispensing station of claim 1, wherein the actuation member comprises a vertical nose corresponding to the recess of the separate second opening of the opening member.

3. The storage and dispensing station of claim 2, further comprising:

the interaction between the hub and the lower coupling portion defines an effective coupling engagement depth; and the interaction between the actuation member and the opening member defines an effective holding engagement depth, wherein the coupling engagement depth is greater than the holding engagement depth.

4. The storage and dispensing station of claim 3, wherein the hub and the opening member have an identical effective height in relation to a vertical axis of the dispensing station.

5. The storage and dispensing station of claim 4, wherein the lower coupling portion, in relation to a vertical axis of the storage container, has an effective depth below an effective depth of the actuation member.

6. The storage and dispensing station of claim 3, wherein the lower coupling portion and the actuation member have an identical effective depth with respect to a vertical axis of the storage container.

7. The storage and dispensing station of claim 6, wherein the hub, in relation to a vertical axis of the dispensing station, has an effective height above an effective height of the opening member.

8. A storage and dispensing station for a blister machine, comprising:

a storage container comprising:

a housing defining a receiving space;

a bottom face having a central coupling opening;

a separating device arranged in the receiving space, the separating device comprising a plurality of vertical channels;

a coupling device extending into the central coupling opening and having a lower coupling portion;

a holding device comprising a holding member and an actuation member, the holding device configured to prevent rotation of the separating device in a first position and to allow rotation of the separating device in a second position; and a dispensing station, comprising:

a rotary drive comprising a shaft and a hub seated on the shaft, the hub disposed in a first opening in a top surface of the dispensing station, the rotary drive configured to provide a force-transmitting interaction with the lower coupling portion; and an opening member configured to interact with the actuation member of the holding device, the opening member comprising a separate second opening comprising a depression in the top surface of the dispensing station that is disposed outside of and adjacent to an outer perimeter of the first opening in the top surface of the dispensing station, wherein the lower coupling portion, the hub, the actuation member and the opening member are configured to provide a first interaction between the lower coupling portion and the hub prior to providing a second interaction between the actuation member and the opening member when arranging the storage container on the dispensing station.

9. The storage and dispensing station of claim 8, wherein the second interaction is configured to move the holding device into a release position.

10. The storage and dispensing station of claim 9, wherein the hub is rotatable in a de-energized state.

11. The storage and dispensing station of claim 8, wherein the actuation member comprises a a vertical nose corresponding to the depression of the opening member.

12. The storage and dispensing station of claim 11, wherein the first interaction defines an effective coupling engagement depth, the second interaction defines an effective holding engagement depth, and the coupling engagement depth is greater than the holding engagement depth.

13. The storage and dispensing station of claim 8, wherein the hub and the opening member have an identical effective height in relation to a vertical axis of the dispensing station.

14. The storage and dispensing station of claim 13, wherein the lower coupling portion, in relation to a vertical axis of the storage container, has an effective depth below an effective depth of the actuation member.

15. The storage and dispensing station of claim 8, wherein the lower coupling portion and the actuation member have an identical effective depth with respect to a vertical axis of the storage container.

16. The storage and dispensing station of claim 15, wherein the hub, in relation to a vertical axis of the dispensing station, has an effective height above an effective height of the opening member.

17. A method for placing a storage container of a storage and dispensing station of a blister machine onto a dispensing station, the method comprising:

providing a dispensing station comprising a hub of a rotary drive disposed in a first opening in a top surface of the dispensing station and an opening member comprising a separate second opening comprising a recess in the top surface of the dispensing station that is disposed outside of and adjacent to an outer perimeter of the first opening in the top surface of the dispensing station;

providing a storage container comprising:

a housing enclosing a receiving space having an internally circular-cylindrical portion and a bottom face having a central coupling opening;

a separating device arranged in the internally circular-cylindrical portion of the housing, the separating device comprising:

a plurality of channels extending vertically through the separating device; and a coupling device extending into the central coupling opening and having a lower coupling portion; and a holding device comprising a holding member and an actuation member, the holding device preventing rotation of the separating device via the holding member;

arranging the storage container on the dispensing station;

initiating a first interaction between the lower coupling portion and the hub;

adapting the hub to the lower coupling portion through a rotation and one of a form-fit connection and a frictional connection being produced between the hub and the lower coupling portion when the first interaction begins;

initiating a second interaction between the actuation member and the opening member; and releasing the holding member when the second interaction begins, so that the rotation of the separating device is allowed, wherein the actuation member comprises a vertical nose corresponding to the recess of the opening member, wherein the first interaction is initiated by generating a coupling engagement depth by one of the frictional connection and the form-fit connection of the hub and the lower coupling portion, and wherein the second interaction is initiated by guiding the actuation member into the opening member and releasing the holding member, thereby generating a holding engagement depth, wherein the coupling engagement depth is greater than the holding engagement depth.

* * * * *